June 29, 1937.  J. FLAWS, JR  2,085,578

FILAMENT MOUNTING AND MECHANISM THEREFOR

Filed Feb. 18, 1936  4 Sheets-Sheet 1

Inventor:
John Flaws, Jr.,
by Harry E. Dunham
His Attorney.

June 29, 1937.  J. FLAWS, JR  2,085,578
FILAMENT MOUNTING AND MECHANISM THEREFOR
Filed Feb. 18, 1936  4 Sheets-Sheet 2

Inventor:
John Flaws, Jr,
by Harry E. Dunham
His Attorney.

June 29, 1937. J. FLAWS, JR 2,085,578
FILAMENT MOUNTING AND MECHANISM THEREFOR
Filed Feb. 18, 1936 4 Sheets-Sheet 4

Inventor:
John Flaws, Jr,
by Harry E. Dunham
His Attorney.

Patented June 29, 1937

2,085,578

UNITED STATES PATENT OFFICE 2,085,578

FILAMENT MOUNTING AND MECHANISM THEREFOR

John Flaws, Jr., Cleveland Heights, Ohio, assignor to General Electric Company, a corporation of New York Application February 18, 1936, Serial No. 64,493

11 Claims. (Cl. 176—4)

This invention relates to the mounting of filaments of electric incandescent lamps and the like, and is especially concerned with such operations as positioning and shaping a filament; attaching it to leading-in wires; shaping or positioning lead-wires and supports or anchors; and securing supports or anchors to lead wires. I have hereinafter explained the invention as employed for thus installing a filament on one type of lamp "spider" or "stem" of usual glass and wire construction, and in connection with a mount-making machine such as shown in U. S. Patent No. 1,907,532 granted May 9, 1933 to John Flaws, Jr., although the utility of my mechanism and apparatus is not limited to this particular application. Various novel features and advantages of the invention will appear from the following description of a species or form of embodiment thereof, and from the drawings.

Figures 1, 2, 3, 4, 21:
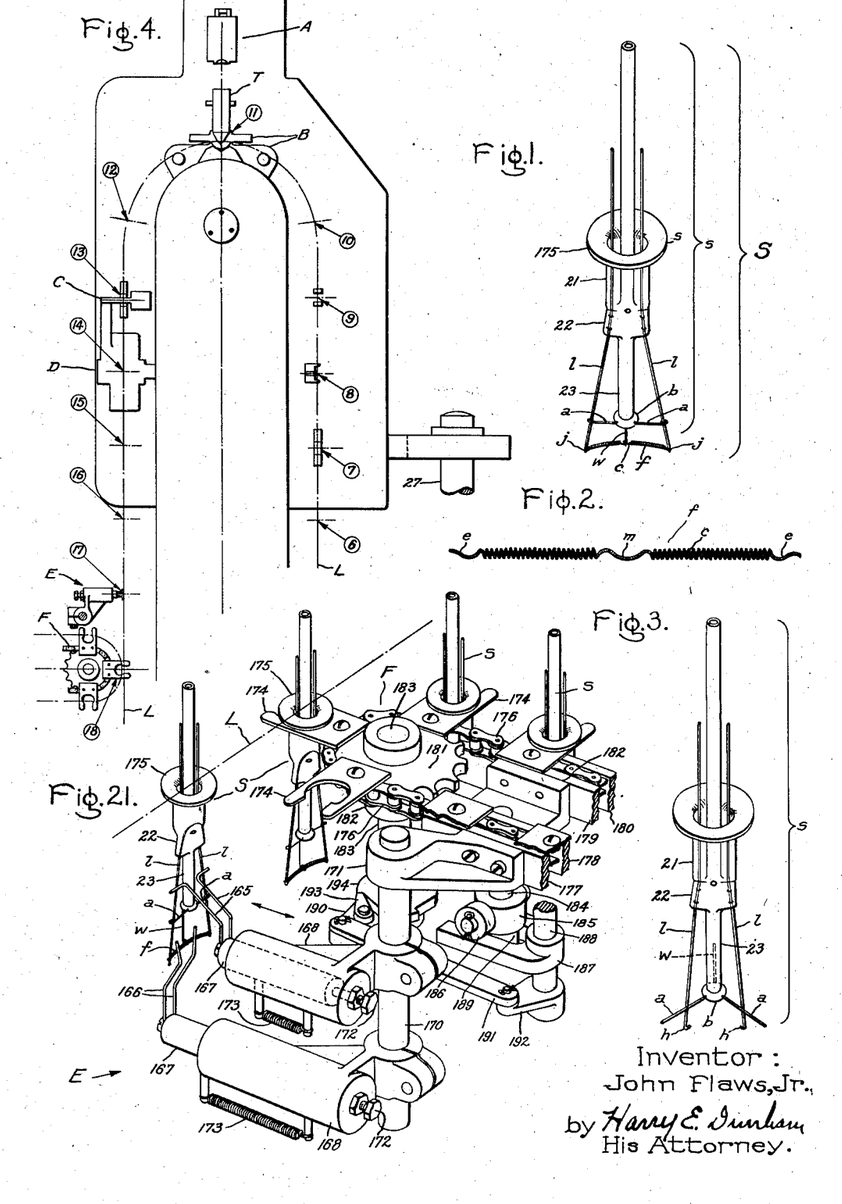
Fig. 1 is a perspective or tilted view of a lamp mount as completed in accordance with my invention.
Fig. 2 is a plan view of one form of double-coiled filament prior to its incorporation in the lamp mount.
Fig. 3 is a perspective or tilted view of the lamp stem or spider before application of a filament thereto.
Fig. 4 is a partial plan view of the mount-making machine of the aforesaid Flaws patent, equipped with the mechanisms of my present invention.
Fig. 21 is a perspective or tilted view of mechanism for finally positioning the lead and anchor wires, in action on a lamp mount, and a portion of the unloading conveyor.

Fig. 1 shows the lamp mount S as completed by the mechanism hereinafter illustrated and described. This mount comprises a spider $s$ and a filament $f$. The spider $s$ comprises a glass stem 21 with leading-in wires $l$, $l$ sealed through the stem-press 22 and extending inward somewhat beyond the top button $b$, at the inner end of the stem rod 23. The filament $f$ is connected between the inner ends of the leads $l$, $l$ by the clamped joints $j$, $j$, and is intermediately supported by the anchor wire $w$ fused into the button $b$ and provided with an eye embracing the mid-portion of the filament. This mount S differs from that shown in said Patent No. 1,907,532 not merely in that the filament $f$ extends more nearly or even quite in a straight line between the leads $l$, $l$ and has only the one intermediate support $w$, but also in having anchor or support wires $a$, $a$ fused into opposite sides of the button $b$ and provided with eyes embracing the lead wires $l$, $l$. These anchors $a$, $a$ not only position the lead wires $l$, $l$ definitely and accurately relative to the filament $f$ and the support $w$, and insure uniform stretching and tension in the filament, but also prevent distortion and displacement of the lead wires and of the filament if the lamp is subjected to heavy shock in shipping and handling. The leads $l$, $l$, anchors $a$, $a$ and intermediate support $w$ all lie approximately in an axial plane of the mount corresponding to the plane of the paper and the stem 21 and rod 23: leads $l$, $l$ and anchors $a$, $a$ being rather in front of such axial plane and support $w$ rather behind it.

The filament $f$ may preferably be of a double-coiled or "coiled-coil" type, comprising fine refractory metal (tungsten) wire coiled into a minor helix $e$ (which may be so fine as to look like a simple wire), and then again coiled into a larger, major helix which is apparent as such,—though the invention is also useful for filaments of other types. Fig. 2, illustrating one form of filament $f$ as supplied to the machine, shows the fine minor coil $c$ as not coiled into a right major helix at its ends $e$, nor at its mid-portion $m$,—although this last, especially, is not at all essential. However, the ends $e$, $e$ and mid-portion $m$ are shown in Fig. 2 as loosely coiled, to the extent of about one helix turn of extremely high pitch.

Fig. 3 shows the lamp spider $s$ without the filament $f$, as it is first presented to the mechanism herein illustrated and described. As here shown, the ends of the lead wires $l$, $l$ are bent into hooks $h$, $h$ to receive the ends $e$, $e$ of the filament $f$ and to be afterward closed and clamped tight on them, as at $j$, $j$ in Fig. 1. The support and anchor wires $a$, $w$, $a$ radiate from the button $b$ substantially in a plane perpendicular to the stem rod 23, the support $w$ to the opposite (rear) side of the axial plane of the mount from leads $l$, $l$ and anchors $a$, $a$. The leads $l$, $l$ diverge (forward) from the axial plane of the mount somewhat, and also diverge from one another.

Fig. 4 affords a schematic plan view of the end of the mount-making machine shown in the Flaws Patent No. 1,907,532 at which the operations with which my invention is concerned may be performed: to wit, at the positions or stations marked 11, 13, 14, and 17, corresponding to those so marked in said patent. The spider $s$ shown in Fig. 3 may be fabricated in the machine of said Flaws patent at stations preceding station 11, and may be brought to station 11 and carried thence in succession to stations 12, 13, 14, and 17 by any suitable intermittently-acting carrying or transfer mechanism (not shown) such as that of said patent,—preferably flare-up and bottom-down as shown in Figs. 1, 3, and others, with the common plane of the leads $l$, $l$ always parallel to the direction of travel of the spider or mount, and with the support $w$ toward the inside of the line of travel L of said mount. The filament $f$ is definitely positioned and shaped in front of station 11, by mechanism marked A. It is then transferred by transfer device T to spider $s$ at said station 11, where its ends $e$, $e$ are engaged in the hooked ends $h$, $h$ of the leads $l$, $l$ and said hooks clamped upon the filament ends, and where the support wire $w$ is positioned and its end wrapped or curled about the middle of the filament, all by mechanism B. Station 12 is an idle position, as in said patent. At station 13, the anchor or support wire $w$ is bent back, by mechanism C, to such a position that the filament will have just the proper tension when the mount is completed. At station 14, (which is an idle position in said patent), the lead wires $l$, $l$ are brought more nearly to their proper ultimate positions, and the ends of the supports $a$, $a$ are curled loosely around them to keep them in the proper general positions while permitting limited (resilient) flexure, all by mechanism D. At station 17, the lead wires $l$, $l$ and supports or anchors $a$, $a$ are bent back or shifted into positions more nearly in a plane with the stem rod 23, and the mid-portion of filament $f$ in the curled end or loop of support $w$ is adjusted as required to assure equal tension in the halves of the coiled filament, all by mechanism E. The result is the completed mount as shown in Fig. 1. At station 18, the completed mounts S are removed and carried away from the machine by a conveyor F.

The shaft 27 is one of the main actuating cam-shafts referred to in the aforesaid patent; and it is to be understood that all moving parts on mechanism hereinafter mentioned for which no source of motion is specified may be cam-actuated from one of these cam-shafts, or from any other suitable moving part of the machine.

Figures 5, 10, 11, 12, 13, 15, 16:
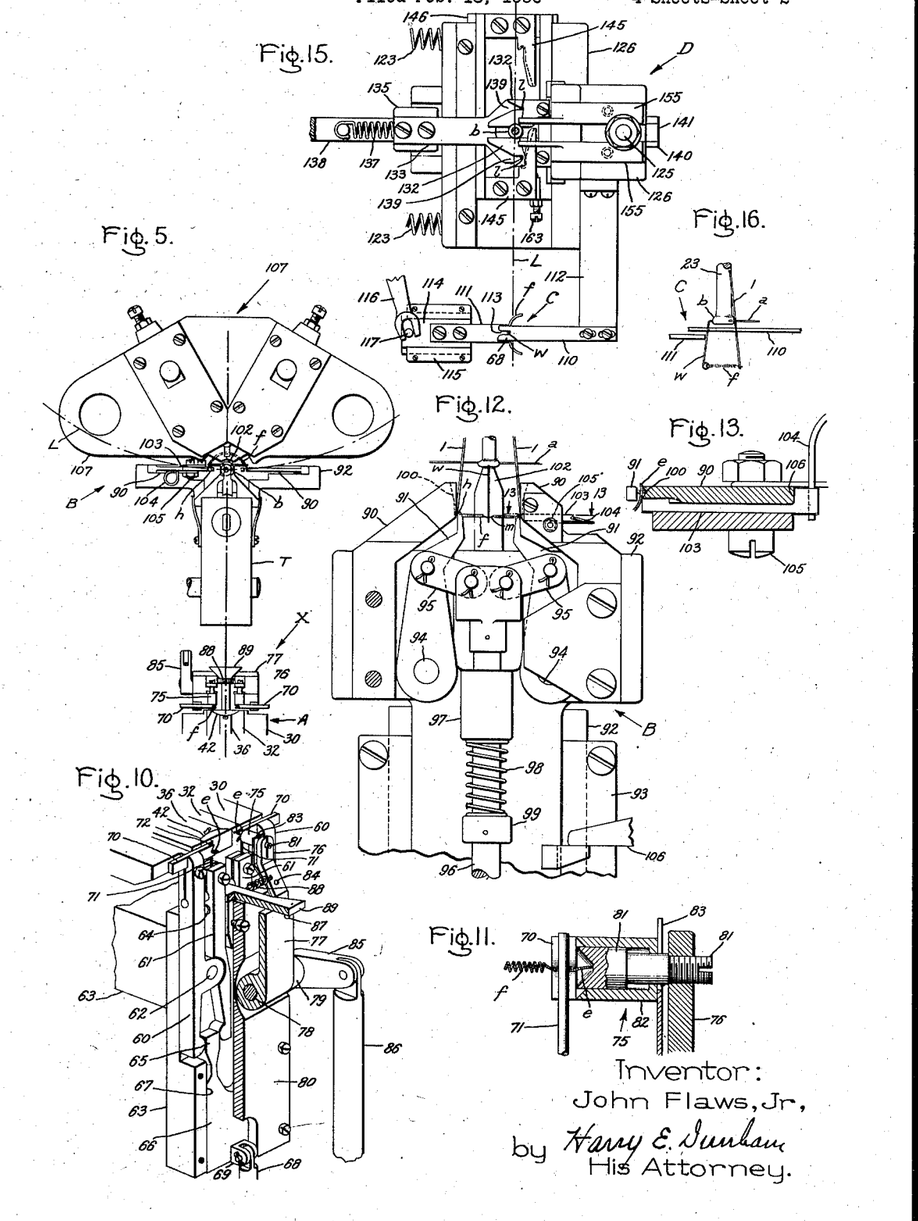
Fig. 5 is a plan view of mechanisms for shaping and positioning the filament for attachment to the mount, transferring it to the mount, and attaching it thereto.
Fig. 10 is a perspective view showing part of the filament positioning mechanism illustrated in Figs. 6 to 9, together with other mechanism for positioning the filament, the view being taken substantially from above the position and according to the arrow marked "X" in Fig. 5.
Fig. 11 is a fragmentary sectional view of some of the parts shown in Fig. 10.
Fig. 12 is a side view of the mechanism for clamping the lead wires to the filament ends.
Fig. 13 is a fragmentary plan view of certain parts shown in Fig. 11, on a larger scale, with one of the clamping jaws in horizontal section as indicated by the line and arrows 13—13 in Fig. 12.
Fig. 15 is a plan view of mechanism for shaping or positioning a filament support of the mount and of an associated mechanism for finally positioning the leading-in wires and the coacting anchors, and securing the anchors to the lead-wires.
Fig. 16 is a fragmentary side view of the shaping and positioning means of Fig. 15, in action on a lamp mount.

Referring now to station 11 and to Figs. 4 and 5, the filament $f$ is fed in and presented to the positioning and forming mechanism A in front of station 11 by any suitable means (not shown), such as the feeding mechanism of said Flaws patent.

Figures 6, 8:
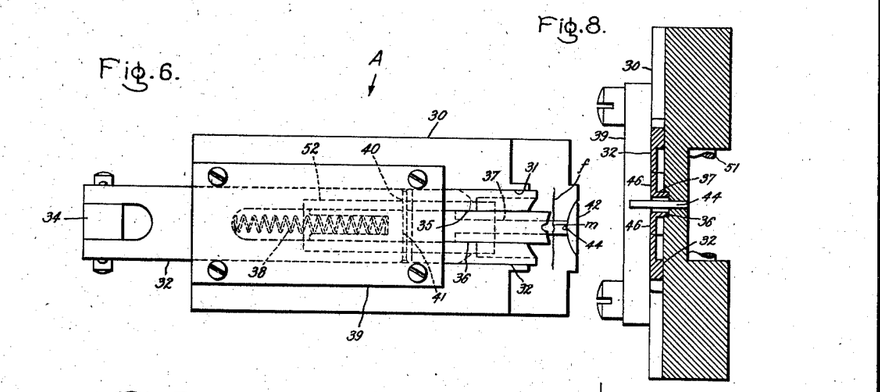
Fig. 6 is a plan view of mechanism for shaping and positioning the filament.
Fig. 8 shows a cross-section through the same mechanism taken as indicated by the line and arrows 8—8 in Fig. 7, on a scale intermediate between those of Figs. 6 and 7.
Figure 7:
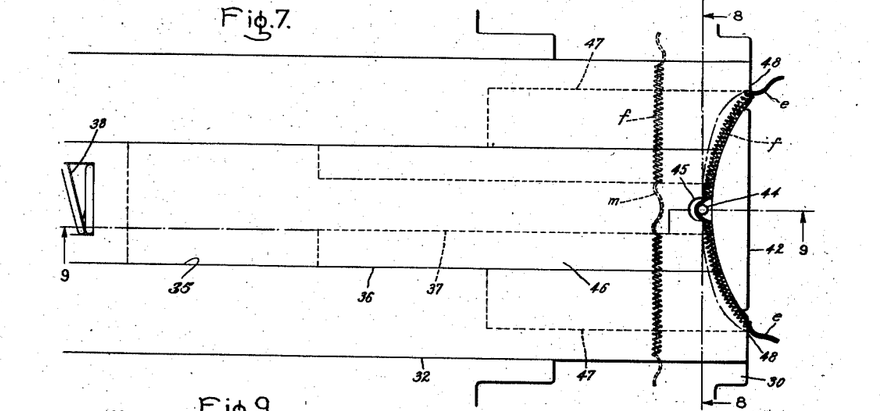
Fig. 7 is a partial plan view of the mechanism shown in Fig. 6, on a larger scale.
Figure 9:
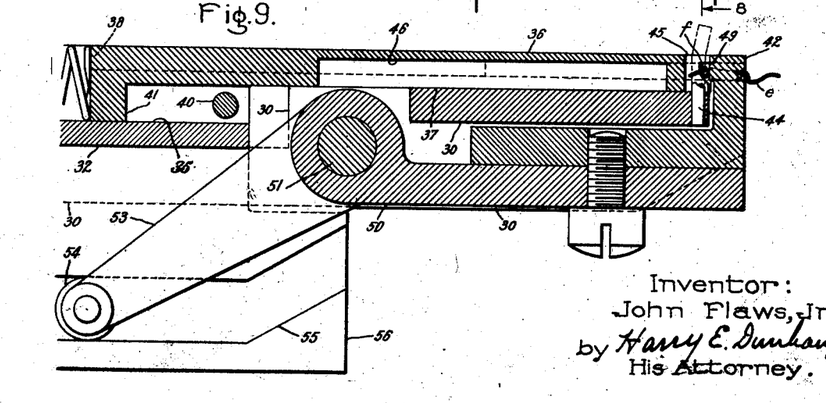
Fig. 9 shows a longitudinal section through the mechanism, taken as indicated by the line and arrows 9—9 in Fig. 7.

Except as here otherwise shown and described, the mechanism A for positioning and shaping the filament $f$ may correspond to that shown for the same purpose in the aforesaid Flaws patent. As shown in Fig. 5, this mechanism A comprises a base-plate or slide 30 (corresponding to the slide 441 in Fig. 22 of said patent, and similarly operated). This base-plate or slide 30 (Figs. 6, 7, 8, and 9) is recessed and forked to afford longitudinal ways 31 for another slide 32, which may be actuated by suitable means (not shown) engaging a roller 34 mounted on a pin in a recess at the rear of said slide 32,—as in said patent. The slide 32 has longitudinal ways 35 for a sub-slide 36, which has a central longitudinal rib 37 engaged in a corresponding groove in the bottom of the slideway 31 of base-plate 30, as shown in Figs. 8 and 9. The rear portion of sub-slide 36 is thicker, even, than its ribbed center, and the rear portion of the slideway 35 in slide 32 is correspondingly deeper, as shown in Fig. 9. The sub-slide 36 is urged forward (to the right in Figs. 6, 7, and 9) relative to slide 32 by a helical compression spring 38 mounted in the forked rear end of sub-slide 36 and acting against the closed end of ways 35. The spring 38 is held in place by a cover-plate 39 secured to base-plate 30 at either side of its ways 31, over both slides 32 and 36. Forward motion of slide 36 relative to slide 32 is limited by coacting engagement means on these slides, comprising a transverse pin 40 across the ways 35 of slide 32 and a shoulder 41 afforded by the thicker rear portion of slide 36, as shown in Figs. 6 and 9. The forward ends or edges of both slides 32 and 36 are curved in a concave arc corresponding to the curvature of an anvil or die 42 upstanding above the base-plate 30 as hereinafter described,—though not mounted directly on the base-plate 30. Just behind the die 42, there is an upstanding stud 44 fixed in this end of the base-plate 30, as best shown in Fig. 9, and the front edge of slide 36 has a deep vertical notch 45 adapted to accommodate pin 44, with considerable clearance, when slide 36 engages die 42 as shown in Figs. 7 and 9. The upper end of stud 44 is preferably bent forward slightly. As best shown in Figs. 7, 8, and 9, the forward portion of slide 36 is reduced underneath at either side of its longitudinal rib 37, so as to afford space under the resultant thinned "wings" 46, 46 somewhat more than sufficient to accommodate a filament $f$, as in Fig. 9; and the portions of slide 32 to either side of slide 36 are similarly reduced or recessed as indicated by the dotted lines 47, 47 in Fig. 7, to a width enough greater than that of die 42 to let filament *f* extend forward past the ends of die 42 between said ends and the corners 48, 48 of the recesses, as also shown in Fig. 7. The front end of the longitudinal rib 37 of slide 36 is recessed or notched horizontally as shown in section at 49 in Fig. 9, with the lower side of the notch sloping upward so as to tend to lift the corresponding portion of filament *f* slightly.

Referring to Fig. 9, it will be seen that the die or anvil 42 is not mounted directly on the base-plate 30, but on a bracket 50 hinged thereto on a pivot pin or pintle 51 extending between the sides of an opening 52 in the base-plate 30. During co-action of the die 42 with the slides 32 and 36, the bracket 50 is held in the position shown in Fig. 9 by a crank arm 53 rigid with said bracket 50 and carrying a roller 54 engaged in a lateral cam groove 55 in a part 56 attached to slide 32 and depending through opening 52 in base plate 30. When the slide 32 is moved rearward (to the left) from its position in Fig. 9 far enough for roller 54 to enter the upward-sloping forward end of cam groove 55, bracket 50 and die 42 swing downward and to the left relative to the base-plate 30, out of the way, leaving filament *f* free for removal by the transfer device T as hereinafter described.

The filament *f* (as shown in Fig. 2) is fed to the mechanism A when the slides 32 and 36 are in their retracted or rearward positions, somewhat behind those shown in Fig. 6, and is deposited on the base-plate 30 in front of the retracted slides 32, 36. The slide 32 being moved forward, the slide 36 advances with it, and the front end of its rib 37 engages the filament *f* a little beyond the position of the slides in Fig. 6. In its further advance, the slide 36 pushes the filament forward until its mid-portion *m* engages stud 44; whereupon the further advance of slide 36 rolls filament *f* as much as may be needed to bring the mid-portion *m* as far as possible to the left of the major filament coil axis. The forward movement of slide 32 continuing after slide 36 strikes the die 42 (as permitted by spring 38) its corners 48, 48 bend the filament *f* forward around the corners of die 42, with its ends *e, e* sticking out as shown in Figs. 7 and 9.

In order to make clearer just how the filament *f* is correctively rolled as just described, a dotted showing of filament *f* in such a position as it may have when first encountered by slide 36 has been superposed on Fig. 7, for ready comparison with its final position against pin 44 and die 42,—showing that whereas the very mid-most portion *m* lay to the right of the axis of the major filament coil initially, it finally lies to the left of such axis: i. e., at the opposite side of the coil axis from the die 42. The comparison also shows how the mid-portion *m* is bent and somewhat stretched out around pin 44. It is this portion *m* that the anchor or support *w* afterward engages, when the filament *f* is subsequently placed on the spider *s* as in Fig. 1. However, it will be understood that in the case of a filament *f* whose mid-portion is tightly coiled just like the rest, the filament will be fed forward by the slide 36 without any correctional rolling. In this case, pin 44 may be dispensed with, or merely used to give the middle of the filament a bend.

Both slides 32 and 36 now remain stationary awhile, with their front edges overlying the filament coils against the die 42. While the filament *f* is thus held bowed, with its ends *e, e* projecting in front of the parts 30, 42, 32, 36 as described, other parts of the mechanism A come into action to further shape the filament *f* and position its ends *e, e* accurately for subsequently engaging the hooked ends *h, h* of the leads *l, l*. The mechanism for dealing with the filament ends *e, e* is illustrated in Figs. 10 and 11, and corresponds in the main to that shown in Figs. 22 and 24 of said Flaws patent.

For positioning or "centering" each filament end *e* in a vertical plane,—speaking with reference to Figs. 6, 7, 9, 10, and 11,—there is a gripper device comprising a pair of co-acting rocking finger-levers 60, 61, pivoted on a common horizontal stud 62 carried by a fixed support 63. The upper ends of the fingers 60, 61 are urged apart by an interposed helical compression spring 64, but can be brought together as shown in Fig. 10 by downward movement of a cam 65 operating between the lower ends of the fingers. The cams 65 (only one visible in Fig. 10) for the two pairs of fingers 60, 61 consist of the upper ends of a single U-slide 66 movable up and down in ways 67 on the support 63, and actuated through a rod 68 pivoted in a clevis 69 on said slide. Rod 68 may be operated as described in the aforesaid Flaws patent. For engaging the filament end *e* as it projects more or less horizontally from between die 42 and slide 32, a block 70 with V-notched end is adjustably clamped in the split upper end of the finger 60, and a stiff upstanding wire member 71 (somewhat springy) in the upper end of the finger 61. The block 70 has a deep, narrow slot 72 to receive the member 71, extending in a vertical plane at least to about the bottom of the V-notch.

For positioning each filament end *e* endwise, in a direction perpendicular to the vertical plane in which the fingers 60, 61 move, there is a funnel-like socket device 75 on the upper end of an arm 76 carried by a bracket member 77 fast on a shaft 78 journalled in lugs or ear 79 (only one being here shown) on a cover-plate 80 secured to the ways 67 over cam slide 66. As shown in Fig. 11, the socket device 75 comprises a stud 81 screwing and adjustable axially in arm 76, and having an enlarged head with a conical end recess. Around the stud head is a sleeve 82 having its forward edge conically bevelled in correspondence with the recess in stud 81 and having an internal shoulder for engaging the head, yieldingly urged and held forward projecting in front of the head by a leaf spring 83 attached to the arm 76 as by a rivet 84. For rocking bracket 77 about the axis of shaft 78 and thus moving socket device 75 toward or from blocks 70 and the parts 32, 42, there is a crank arm 85 fast on shaft 78 and a link rod 86 pivoted to said crank and actuated by any suitable means. Each arm 76 is pivoted at 87 on bracket 77, so that it may rock in a more or less vertical plane about parallel with that in which fingers 60, 61 move. The two arms 76, 76 (only one shown) are interconnected and urged toward one another by a helical tension spring 88; but their positions are determined by the edges on intervening cam 89 projecting forward from the structure 63.

The filament *f* having been acted on by slides 32, 36 as described above, and being held against die 42 as shown in Fig. 7, with its projecting ends *e, e* between the then separated parts 70, 71 of corresponding fingers 60, 61, the cam slide 66 is moved downward (from its previously elevated position to a position a little higher than in Fig. 10), thus causing parts 70, 71 to come together on each filament end *e* and center it vertically and horizontally in the V-notch of block 70, though without gripping it tightly. Thereupon bracket 77 is rocked backward to move socket device 75 rearward (in Fig. 10) against the filament end e, which is rather loosely held between parts 70 and 71, and push this end e rearward until stud 81 approaches or even encounters block 70,— sleeve 82 telescoping on stud 81 and receding when it encounters the gripper block 70. The sleeve 82 initially assists in catching the filament end e and directing it into the conical socket of stud 81. As the filament ends e, e are thus pushed back, the filament f "straightens" away from die 42 slightly, about as indicated by the dot and dash lines in Fig. 7. The filament ends e, e being now definitely positioned as desired in every sense, cam slide 66 is moved downward to about the position shown in Fig. 10, forcing the parts 70, 71 tighter together to grip and hold the filament ends e, e firmly in the V-notches of blocks 70, 70. After this, bracket 77 is rocked forward with its socket devices 75, 75, which are swung apart out of the way by the diverging edges of cam 89.

Hereupon the transfer device T (Figs. 4 and 5) comes into action, swinging about 180° from its position in Fig. 5 over toward the filament ends e, e, and seizing or gripping them between parts 70, 71 and parts 32, 42. Thereupon the cam slide 66 moves upward to open the holding means 70, 71; slides 32, 36 move rearward and die 42 swings down out of the way; and transfer device T swings back with the filament f to its position in Figs. 4 and 5. As it does so, it places the filament ends e, e accurately in the open lead-hooks h, h, that are waiting at station 11 to receive them, and are thereafter clamped tight on the filament ends e, e by the mechanism B shown in Fig. 12.

As shown in Figs. 5 and 12, the mechanism B comprises a pair of coacting clamping jaws 90, 91 for each lead-hook h, mounted on a slide-head 92 movable up and down in fixed ways 93, as in the aforesaid Flaws Patent No. 1,907,532. The outer jaws 90, 90 are fixed on the head 92, while the inner jaws 91, 91 are pivoted thereon at 94, 94 and have link connections 95, 95 to a head or block on the upper end of an upright rod 96, adapted to slide through one or more guides 97 on slide-head 92. This rod 96 may be operated as disclosed in the aforesaid patent. A helical compression spring 98 is interposed between the guide 97 shown and a collar 99 keyed fast to rod 96. In the acting face of each jaw 90 is a V-groove 100, deep at its upper end, but tapering downward to a depth about equal to the diameter of a lead l. On the slide-head 92, between the two pairs of jaws 90, 91, there is an upstanding finger 102 for engaging the filament anchor or support w. In a guideway in one of the fixed jaws 90 is a sliding pusher-plunger 103 that is yieldingly pressed inward by a curved wire spring 104 mounted on a screw 105 in said jaw, to engage the filament f adjacent the same clamp jaw 90, as shown in Fig. 13, and correct its tendency to assume an unsymmetrical position when the hooks h, h are closed on it: i. e., pressure of plunger 103 against the filament adjacent the clamp joint j, obviates distortion of the bowed form of the filament. This tendency toward such distortion is due to the twist in the filament ends e, e. The plunger 103 has a stop shoulder 106 that engages jaw 90 and limits the projection of its acting end beyond jaw 90 to a proper amount: e. g., about .005 inch.

The spider s is brought to the position shown in Fig. 12 while the slide-head 92 is in a lower position than there shown, with the jaws 90, 91 below the lead hooks h, h. Then the transfer mechanism T acts as just described to place the filament ends e, e in the open hooks h, h. The slide-head 92 is then raised by upward movement of rod 96 until the hooks h, h are engaged in the grooves 100, 100 of jaws 90, 90 (jaws 91, 91 still being open), when upward movement of head 92 is arrested by a stop 106 as diagrammatically indicated in Fig. 12. Thereupon further upward movement of rod 96 forces jaws 91, 91 outward against hooks h, h, closing or clamping them shut on the filament ends e, e about as shown at j, j in Fig. 1. As this occurs, the end of plunger 103 is engaged by the coiled filament f just in front of the corresponding clamped joint j, and prevents unsymmetrical bowing out of the filament toward this side. Thereafter, other parts of mechanism B (generally and collectively indicated by reference numeral 107 in Fig. 5, and fully disclosed in Figs. 28–33 and the related description in the aforesaid Flaws patent) bend support wire w down from its position in Fig. 3 to that shown in Fig. 12 and curl the end of this anchor wire w around the mid-portion m of the filament. As the spider s here shown has only one support wire w, instead of three corresponding support wires in the aforesaid Flaws patent, only the parts of the said Flaws mechanism required for this single support wire are indicated in Fig. 5: i. e., those for the middle support wire of Flaws. The result is the uncompleted mount S' as shown in Fig. 14, in which support wire w now approximates or approaches more closely the axial plane of the mount, extending downward and rearward from button b.

This uncompleted mount S' is now transferred from station 11 past or through station 12 to station 13, Figs. 4 and 15, by any suitable means, such as that shown in the aforesaid Flaws patent. At station 13, it is acted on by the mechanism C shown in Figs. 15 and 16, which bends the support wire w further down, almost into a vertical position, as in Figs. 1 and 20. This mechanism C comprises oppositely acting thin, blade-like members 110 and 111. Member 110 is carried by an arm 112 on a moving part of the mechanism D at station 14, actuated as hereinafter described, and has in its acting free end an open, flaring-mouthed longitudinal guide slot 113 for receiving and steadying the support wire w. Member 111 is carried by a horizontal slide 114 movable in fixed ways 115 and actuated by a lever or crank arm 116 (only partly shown) whose forked end engages around a pin 117 on the rear end of slide 114. Lever 116 may be actuated in any suitable way, as from a cam (not shown) on the longitudinal cam shaft 27 of the mount-making machine shown in the aforesaid Flaws patent. While the mount S' is at station 13, the guide member 110 moves forward and engages support wire w in its slot 113 just below stem-rod button b, so as to steady and guide it; and the pusher member 111 moves forward and engages support wire w a little below the overlapping member 110 and bends it to the right toward member 110, as shown in Fig. 16, into substantially its final (nearly vertical) position in Figs. 1 and 20,—rather closely approaching the axis of the mount as defined by stem rod 23.

The still uncompleted mount S' is now transferred from station 13 to station 14, as by the transfer or carrying means of the aforesaid Flaws patent. At station 14, it is acted on by mechanism D, which positions the leads $l, l$ and curls the ends of the anchor wires $a, a$ loosely around them.

Figure 14:
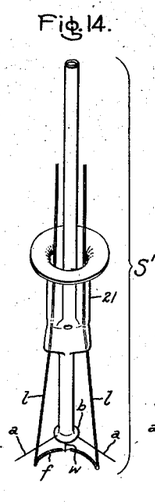
Fig. 14 is a perspective or tilted view of the lamp mount as it leaves the mechanism shown in Figs. 5 and 6 to 13.
Figure 17:
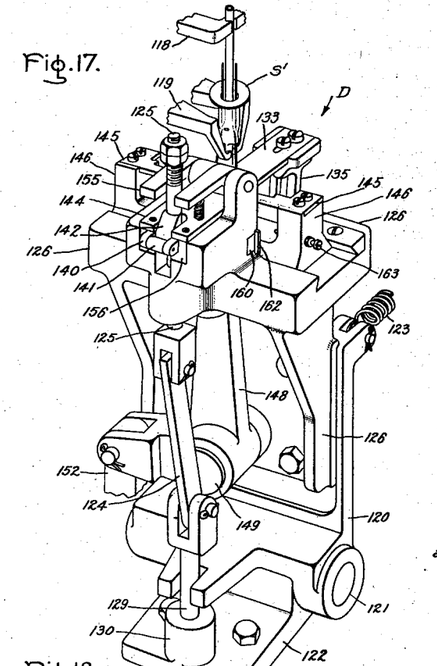
Fig. 17 is a perspective or tilted view of part of the mechanism shown in Fig. 15.

Fig. 17 shows the uncomplete mount S' of Fig. 14 supported and held in definite position by jaws 118, 119 of a conveyor (not shown) such as illustrated in the aforesaid Flaws patent. The principal operating parts of the mechanism D are mounted on a bracket frame 120 that is pivoted about a pin 121 carried by a fixed part 122 on or of the machine frame, so that it can swing crosswise of the line of travel of the mount S'. The bracket frame 120 is biased toward the right in Figs. 18 and 19 (and toward the rear in Fig. 17) by helical tension springs 123, 123 connected to a fixed support (not shown), but can be swung to the left (and forward in Fig. 17) by the downward pull of a link-rod 124 pivotally connected to the bracket structure 120 through a rod 125 slidable in a guide-bore in a portion 126 of bracket 120, as hereinafter described. The lower end of link 124 is pivotally connected to an actuating rod 129 slidable vertically in the guide-bore of a boss 130 on the part 122. A suitable stop (not shown) may be provided to limit the movement of bracket structure 120 in one direction, while its movement the other way may be determined by the actuation of rod 129.

Figure 18:
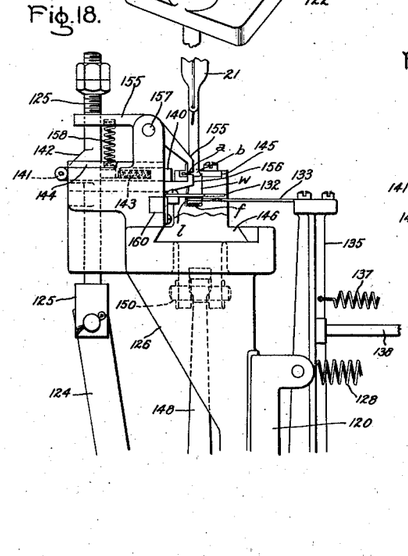
Fig. 18 is a partial side view of the mechanism shown in Fig. 17.

For positioning the current leads $l, l$, there are coacting guide and pusher plates or blades 132, 132, 133, the former (132, 132) carried by the portion 126 of bracket frame 120 (though not directly mounted thereon), and the latter (133) adjustably mounted in a recessed seat at the upper end of a support and actuating arm 135 pivoted at its lower end on bracket 120, on a fulcrum pin not shown. (It is to the bracket portion 126 that supporting arm 112 of guide 110 of the mechanism C in Figs. 15 and 16 is attached, so as to move with bracket frame 120 above pivot 121.) The arm 135 is biased to the right (in Fig. 18) by a helical tension spring 137 connected to a fixed support (not shown), and is thus always kept in engagement with a fixed stop 138. The guide plates 132, 132 are separated to pass to either side of the filament support $w$ below stem button $b$, and have divergent outer edges for engaging and spreading apart the leads $l, l$. These divergent edges terminate in open V-notches 139, 139 to receive the leads $l, l$, Figs. 15 and 19, and to bring and hold them to exactly the desired relative positions. The pusher plate 133 is semicircularly recessed to accommodate the support $w$ and has straight edges (parallel with the line of mount-travel L) for engaging the leads $l, l$ to push them to the bottoms of the V-notches. In operation, the guide plates 132, 132, and the pusher plate 133 advance and overlap each other from opposite sides of the path of travel L of the mount S' (as shown in Figs. 15, 18, and 19), or recede, concurrently,—owing to the reverse swing imparted to arm 135 by the swinging of bracket structure 120.

Figure 19:
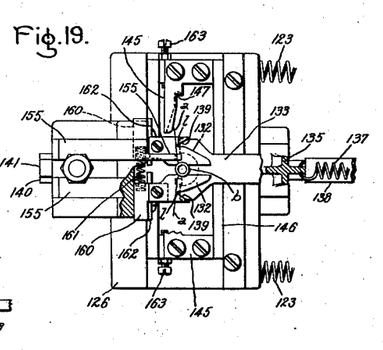
Fig. 19 is a partial plan view of the same mechanism, with certain parts broken away and in section.
Figure 20:
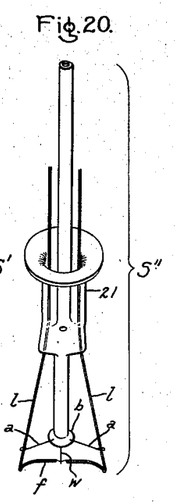
Fig. 20 is a perspective or tilted view of the lamp mount after being operated on by the mechanism shown in Figs. 15 and 17–19.

When the guide plates 132, 132 move to the right (Figs. 18 and 19) with bracket 120 as above described, the end of a pusher bar 140 then projecting forward from the portion of bracket structure 120 engages the oppositely projecting anchor wires $a, a$ at either side of stem button $b$ (above parts 132, 132 and 133) and bends them back from their positions in Figs. 3 and 14 more nearly into a straight line, as shown in Figs. 19 and 20, so that they lie across or against the leads $l, l$. The bar 140 is not fixed on the bracket portion 126, but is arranged to slide in ways therein, and has in its forked rear end a roller 141 adapted to be engaged by an edge-cam 142 on rod 125, to retract the bar as shown in Fig. 18. This is resisted by a helical compression spring 143 housed in a bore in bar 140 and acting against a downward projection on a cover-plate 144 secured over the ways for bar 140. When retracted, the bar 140 leaves room for the action of other parts, to be now described.

For curling the ends of anchor wires $a, a$ around leads $l, l$, there are dies 145, 145 mounted on the ends of a dovetail slide 146 arranged to slide in ways on bracket 120, in the direction of the path of travel L of mount S' or S. In themselves and in their curling action, the dies 145 are similar to those for curling the filament support-wire in the aforesaid Flaws patent. Each die 145 has a sloping face with a hollow or groove therein for engaging the end of an anchor wire $a$ as indicated in Fig. 19 and progressively bending or curling it as the die moves forward in Fig. 19. The sloping face terminates in a semi-circular notch 147 adapted to tighten the bend of the wire into a circular eyelet around the lead $l$ as the notch comes up to the latter. For reciprocating the slide 146 in its ways on bracket 120, there is a rocker 148 fulcrumed on a stud 149 on the bracket 120. Its upper arm is forked to engage around a pivot pin 150 in a clevis on the bottom of slide 146 (Fig. 18), and its other arm is pivoted to the end of a link rod 152 that may be actuated by any suitable means (not shown).

In preparation for the action of the dies 145, 145 on the anchor wires $a, a$, each of these wires $a, a$ is firmly gripped and held (between its fixed end and the corresponding lead $l$) by a clamp comprising movable and fixed jaws 155, 156, pivoted together at 157 and urged to close by an interposed helical compression spring 158. When the parts 132, 132 and 133 have positioned and are holding the leads $l, l$, and the part 140 has positioned the anchors $a, a$, the latter lie on or close over the fixed jaws 156, 156. While the bracket structure 120 is still stationary in this position, the rod 129 moves further upward to the position shown in Figs. 17 and 18, thus releasing the movable jaws 155, 155 and allowing them to close and grip the anchors $a, a$ as shown in Fig. 19, and also pushing the cam 142 up behind roller 141 and retracting bar 140 as shown in Figs. 18 and 19. Thereupon rod 152 is reciprocated to oscillate rocker 148 and reciprocate slide 146, thus bringing first one die 145 and then the other against the free end of its anchor wire $a$, and curling each of them into a full-circle eyelet around its lead $l$. For this slight movement of the leads $l, l$ is desirable; and to permit such movement, the guide plates 132, 132 are mounted on lugs of slide-blocks 160, 160 movable in ways in the part 126 of bracket 120. The slide-blocks 160, 160 are urged apart by an interposed helical compression spring 161, and their normal positions are determined by engagement of their lugs against shoulders on cover plates 162, 162 (Figs. 17, 18, and 19) that retain the slide-blocks in the ways. As each die 145 approaches the end of its anchor-curling movement above described, a screw 163 adjustably fixed in the end of the slide 146 engages the slide-block 160 carrying the corresponding guide-plate 132 and displaces it slightly against spring 161, toward the stem-rod button $b$, Fig. 19, thus deflecting the lead $l$ in harmony with the movement of the curl at the end of wire $a$ as it is formed around the lead.

The mount S'' is now as shown in Fig. 20: The slide 146 having returned to its central position, the rod 129 is pulled downward, thus allowing bar 140 to return to normal active position, opening clamps 155, 156, and rocking bracket 120 and arm 135 apart.

This releases the mount S'', which is now as shown in Fig. 20: i. e., its leads l, l and anchors a, a approach or approximate its axial plane more closely than previously, and its filament f is not very much bowed. It is completed as regards parts and their interengagement, but not quite perfected as to their preferred positions. It now travels along path L to station 17, where it is acted on by the mechanism or apparatus E shown in Fig. 21.

As shown in Fig. 21, the mechanism or apparatus E comprises a multiple or two-finger (wire) pusher 165 for engaging the leads l, l about midway between stem-press 22 and anchors a, a, and a similar two-finger presser 166 for (concurrently) engaging the filament f at either side of support w, about midway between said support and the leads. The ends of fingers 165, 165 are shown bent apart into alignment with one another. Each finger device 165 and 166 may consist of a length of wire (preferably springy but rather stiff) bent double (somewhat like a hairpin) and having its bight clamped by a screw to a part 167 of or associated with a bracket device 168. The two brackets 168, 168 are (adjustably) mounted on a bar 170 which is mounted through bracket 171 on the unloading conveyor F and is moved to and from the mount S by the corresponding movements thereof. As one convenient way of providing for adjustment of the finger devices 165, 166 toward and from their common carrier 170, each bracket 168 has a bore in which the part 167 is slidable like a plunger, and is provided with an adjustable screw 172 for engaging the rear end of this plunger. A helical tension spring 173 acting between arms or lugs on plunger 167 and bracket 168 holds each plunger 167 pressed against its stop screw 172.

While the mount S'' is stationary at station 17, the whole apparatus E as above described is moved to the left (in Fig. 21) so that the ends of fingers 165, 165 engage the leads l, l and shift or bend them back till they closely approach or even lie in the axial plane of the mount, thereby correspondingly bending back anchors a, a. In the completed mount S, therefore, the filament f is straight or nearly so. The presser fingers 166, 166 engage the filament f at either side of support w and temporarily press its mid-portion sidewise away from and out of contact with the surrounding curl or eyelet of said support, so that its mid-portion can shift longitudinally to equalize the tension in it at opposite sides of support w. When the apparatus E recedes, therefore, the two halves of the filament f assume the same tautness and shape. The now perfected mount S moves along the path L to station 18, whence it is removed by conveyor F.

This equalization of tension in the filament f at opposite sides of support w is especially desirable in the case of (double-coil) filaments that are without any relatively straight mid-portion m such as shown in Figs. 1 and 2. But filaments having a straight mid-portion m shaped as shown in Fig. 2 (and described in connection with Figs. 6-9) do not so much need equalization; and in dealing with such filaments the pushers 166, 166 may often be adjusted (by the screws 172, 172) so as not to engage the filament, or may be removed from the machine altogether.

The conveyor F located at station 18 engages the mount S through one of a plurality of holders 174 which is moved in under the stem flange 175 of the mount S and which catches mount S when it is released by the mounting machine. The holders 174 are mounted on a chain 176 which is supported through engagement of the rails 177, 178 and 179, 180 with said holders 174 and through engagement of sprocket 181 with said chain 176. The holder 174 receiving the mount S is mounted on a portion of the chain 176 on the sprocket 181 and is moved toward the mount S by corresponding movements of the chain 176, the sprocket 181 and the rails 177, 178, 179 and 180. These parts move as a unit since the ends of the rails shown in the drawings are mounted on bracket 182 and the sprocket 181 is mounted on the shaft 183 which extends through said bracket 182. The parts are moved forward by mechanism (not shown) which is preferably cam actuated and which is operated from shaft 27. The end of the conveyor F shown in the drawings is supported by bracket 182 which has a post 184 extending downwardly therefrom which engages, through collar 185 and rollers 186 on both sides thereof, the arms of yoke 187. The yoke 187 is stationary, being mounted through post 188 on a portion of the machine (not shown) and guides the conveyor F through engagement of the roller 189 on the lower end of post 184 which is located in the ways formed by the arms of said yoke 187. The mount S is carried out of the mount machine by indexing and receding movements of the chain 176 which occur at the same time. The indexing movement of the chain 176 results from the receding movement which causes the arm 190 on the lower end of shaft 183 to turn since it is connected through bar 191 and bracket 192 to the stationary post 188. The arm 190 is pivoted on shaft 183 and is caused to turn said shaft 183 and the sprocket 181 thereon through engagement of the pawl 193 with the ratchet 194 which is attached thereto. The pawl 193 is carried on a pin extending from arm 190.

It is to be remarked that while in Figs. 15, 17-19, and 21 various parts of the mechanisms C and D extend across the path of travel L of the mount S, S'', or S', so as apparently to interfere therewith, such parts are actually shifted out of the way, to one side or the other, from their positions as shown when movement of the mount occurs: e. g., the parts 120 and 132, 132, 145, 145, 146, 155, 156 to the left in Figs. 18 and 19, and the parts 133, 135 to the right. The relations are reversed, of course, in Fig. 15, the parts 110, 120, and 132, 132, 145, 145, 146, 155, 156 being shifted to the right from the positions there shown, and the parts 111, 133, 135 to the left.

Besides the above-mentioned Flaws Patent No. 1,907,532, various mechanisms and features of the mount-making machine are shown in Flaws Patent No. 1,907,533 of the same date.

What I claim as new and desire to secure by Letters Patent of the United States is:

1. A method of completing and perfecting a filament mount comprising current leads with hooked ends projecting from and beyond its stem-press, an intermediate support for a filament between the leads, and anchor-wire supports for the leads between their hooked ends and the stem-press; which method comprises bringing a coiled filament into a bowed form, and holding it so with coiled end portions projecting, bringing said projecting ends to definite positions and so holding them, and seizing the filament ends adjacent the holding means and placing the coiled ends in the lead hooks; clamping said hooks tight on said filament ends and also pressing against the filament adjacent one of the clamps to obviate distortion of the bowed form of the filament; curling the intermediate support-wire around the mid-portion of the filament, and also bending the support-wire into position approaching the axis of the mount; bringing the leads to definite positions approaching an axial plane of the mount, and bending the anchor wires into corresponding positions across the leads and curling their ends around the latter; and temporarily pressing the mid-portion of the filament out of contact with the intermediate support so as to allow equalization of tension in the filament at opposite sides of said intermediate support.

2. A method of completing a filament mount comprising current leads projecting from and beyond its stem-press, a bowed filament connected between said leads, a stem rod provided with an intermediate support for the filament between the leads, and anchor-wire supports for the leads carried by the stem rod between the filament and the stem-press; which method comprises bending the intermediate support wire into position approaching the axis of the mount; bringing the leads to definite positions diverging from an axial plane of the mount, and bending the anchor wires into corresponding positions across the leads; curling the ends of the anchor wires around the leads while the latter thus diverge from the axial plane, so that the curling means may pass the stem rod; and subsequently bending back the leads into positions at least more nearly approaching the axial plane of the mount.

3. A method of completing and perfecting a filament mount comprising current leads with hooked ends projecting from and beyond its stem-press, an intermediate support for a filament between the leads, and anchor-wire supports for the leads between their hooked ends and the stem-press; which method comprises placing coiled ends of a bowed coiled filament in the lead hooks; clamping said hooks tight on said filament ends and also pressing against the filament adjacent one of the clamps to obviate distortion of the bowed form of the filament; curling the intermediate support wire around the mid-portion of the filament, and also bending the support-wire into position approaching the axial plane of the mount; bringing the leads to definite positions approaching an axial plane of the mount, and bending the anchor wires into corresponding positions across the leads and curling their ends around the latter; and temporarily pressing the mid-portion of the filament out of contact with the intermediate support so as to allow equalization of tension in the filament at opposite sides of said intermediate support.

4. A step in perfecting a filament mount comprising current leads, a filament connected between them, and an intermediate support for the filament between the leads, which step comprises temporarily pressing the mid-portion of the filament out of contact with the intermediate support so as to allow equalization of tension in the filament at opposite sides of said support.

5. In a filament mount machine, the combination with a conveyor for carrying filament mounts through a plurality of stations with dwells thereat, and mechanism adjacent and at one of said stations for bringing coiled filaments into bowed form and placing the coiled ends of such a filament in lead hooks of a mount at the station in question, and for clamping the lead hooks on the filament ends while preventing distortion of the bowed form of the filament and curling an intermediate support wire of the mount around the mid-portion of the filament; of mechanism at subsequent stations for bending said intermediate support wire into a position approaching the axis of the mount, for bringing the lead wires to definite positions approaching an axial plane of the mount and bending anchor wires of the mount into corresponding positions across the leads, and for curling the ends of the anchor wires around the leads; and mechanism at a subsequent station for temporarily pressing the mid-portion of the filament out of contact with the intermediate support so as to allow equalization of tension in the filament at opposite sides of said intermediate support.

6. The combination with a filament support and a shaping die upstanding thereabove, of a slide movable toward said die to push a coiled filament against it, and pusher means behind the die surface for engaging the mid-portion of the filament and advancing the same with such rolling of the coil as may be necessary to locate said mid-portion at the opposite side of the coil axis from the die.

7. The combination of means for holding a coiled filament bowed, with an end projecting in front of said holding means; a centering gripper in front of said holding means for centering said projecting end horizontally and vertically, and for gripping and holding it when so centered; and a funnel-socket device movable toward said gripper to engage and center the filament end therein and push it back through said gripper, the outer portion of said socket device being telescopically mounted around the central portion and yieldingly held forward projecting in front of it, so as first to catch the filament end and direct it into the central portion, and then recede when it encounters the gripper device and allow the central portion to approach said device.

8. The combination with clamping devices for clamping lead-hooks on the end portions of a bowed tightly-coiled filament, of a yielding pusher adjacent one of such clamping devices for engaging the bowed filament as said clamping devices close and preventing it from being thereby distorted, owing to the twist in its end portions that are clamped as aforesaid.

9. A mount-making mechanism comprising co-acting oppositely-moving guide and pusher members for engaging the lead wires of a mount and bringing and holding them to desired relative positions, pusher means for engaging oppositely-projecting anchor wires of the mount and bringing them to desired positions across said lead wires, clamps for gripping and holding said anchor wires between their fixed ends and said lead wires, curling dies for engaging the free ends of said anchor wires from opposite sides of the mount and curling them around said lead wires, and means for actuating said guide and pusher members, said pusher means, said clamps, and said curling dies, and bringing them into action substantially in sequence as set forth.

10. A mount-making mechanism comprising a frame and a support movable toward and from one another from opposite sides of a path of travel of lamp mounts to be operated on; coacting guide and pusher members on said frame and support for engaging the lead wires of a mount and bringing and holding them to the desired relative positions; pusher means on said frame for engaging oppositely projecting anchor wires of the mount and bringing them to desired positions across the lead wires; clamps on said frame for gripping and holding said anchor wires between their fixed ends and said lead wires; a slide on said frame movable to and fro in the direction of lamp mount travel and carrying curling dies for engaging the free ends of said anchor wires and curling them around said lead wires, and also carrying means for engaging and shifting said guide members and lead wires as the anchor wires are curled around them; and means for actuating said frame and support and said guide and pusher members, said pusher means, said clamps, and said slide and curling dies and shifting means, and bringing them into action in sequence substantially as set forth.

11. The combination with conveyor means for filament mounts, of pushers adjacent the path of travel of mounts carried by the conveyor movable toward the same to engage the current leads of the mount and bending them toward an axial plane of the mount, and presser fingers concurrently movable toward the mount to engage its filament between said leads and press the midportion of the filament out of contact with an intermediate support of the mount so as to allow equalization of tension in the filament at opposite sides of said intermediate support.

JOHN FLAWS, Jr.